United States Patent van der Puije

[15] 3,647,982

[45] Mar. 7, 1972

[54] TELEPHONE ANTISIDETONE CIRCUIT

[72] Inventor: Patrick David van der Puije, Ottawa, Ontario, Canada

[73] Assignee: Northern Electric Company Limited, Quebec, Canada

[22] Filed: Aug. 13, 1970

[21] Appl. No.: 63,458

[52] U.S. Cl. ....................179/81 A, 179/170 NC, 333/80 T

[51] Int. Cl. ....................H04m 1/58

[58] Field of Search ....................179/81 A, 170 NC; 333/80 T

[56] References Cited

UNITED STATES PATENTS

| | | | |
|---|---|---|---|
| 2,885,492 | 5/1959 | D'Heedene | 179/170 R |
| 3,400,335 | 9/1968 | Orchard | 333/80 T |
| 3,500,262 | 3/1970 | Daniels | 333/80 T |
| 3,513,401 | 5/1970 | Tokunaga | 328/167 |
| 3,530,260 | 9/1970 | Gaunt | 179/81 A |

*Primary Examiner*—Kathleen H. Claffy
*Assistant Examiner*—William A. Helvestine
*Attorney*—Westell & Hanely

[57] ABSTRACT

A transistorized wired circulator transfers power from microphone to telephone line (minimizing sidetone) and transfers power from telephone line to earphone, with microphone, telephone line, and earphone delta connected to the circulator.

3 Claims, 9 Drawing Figures

INVENTOR

PATRICK DAVID van der PUIJE

BY

Westell & Hanley

INVENTOR
PATRICK DAVID van der PUIJE

BY

*Westell & Hanley*

INVENTOR
PATRICK DAVID van der PUIJE
BY
*Westell & Hanley*

INVENTOR
PATRICK DAVID van der PUIJE
BY
Westell & Hanley

TELEPHONE ANTISIDETONE CIRCUIT

This invention relates to a telephone antiside tone circuit.

It is known that a gyrator having four terminals may have two of these connected together and may be used as a three terminal device. As such voltage applied between (say) terminals 1 and 3 produces a current across (say) terminals 2 and 1. This device has been used heretofore for such purposes as the simulation of inductances (since in certain connections, a capacitive load across the output appears as an inductive load across the input) or, more generally in the synthesis of RC active filter circuits. The paired terminals across which power may be applied or received are known as 'ports.'

However, prior to the conception of this invention, the three-port gyrator; (ideally designed) had not been used as a power circulator, taking advantage of the fact that:

| Power Applied say across port | Produces output power across port | but does not result in output power across port |
|---|---|---|
| 3 | 1 | 2 |
| 1 | 2 | 3 |
| 2 | 3 | 1 |

There is therefore with such a three port circulator (ideally designed), a cyclical progression of the three ports, defined by the three terminal pairs, which, though it may be considered as being in either sense numerically or topographically, nevertheless means that power put in at any port appears at the succeeding port in the cyclical progression but not at the preceding port in the cyclical progression. To the extent that the circulator or gyrator deviates, as it must, from ideal design, the power output at the input succeeding port will be diminished and the power output at the input preceding port will be existent, however the ratio of the former divided by the latter will, in the nonideal circulator still be important. In a preferred form the three port circulator is used with the delta connection thereto of the microphone, earphone and line respectively connected across the three circulator ports, in the sense, that power across the microphone appears on the line but not on the earphone, and power applied by the line to the circulator appears at the earpiece but not at the microphone. The elimination (in the ideal circulator) and great attenuation (in the nonideal circulator) of power at the earphone when the microphone is in use, reduces the sidetones which is the principal purpose of this invention.

In a preferred form of the invention the circulator comprises a gyrator formed of two amplifiers which produce phase shafts differing from each other by approximately 180°. Each amplifier has one of its two input and one of its two output terminals connected together to form one of the three terminals of the gyrator used in the circulator. It must be realized that although the cyclical order is important with a circulator, the initial position is not. Thus the designations "first," "second," "third," referring to terminals or ports of the circulator, are interchangeable with regard to any one terminal, but their cyclic order, which is associated with the direction of circulation of power, is not.

The other two circulator terminals of the twin amplifier embodiment, each are provided by a connection of the other output of one amplifier to the other input of the other amplifier.

The direction of circulation between the three terminals in the preferred embodiment is determined by the degree of the phase changes in the two amplifiers which provide phase changes differing by approximately 180° from each other. The relationship between amplifier phase change and circulation direction will be referred to briefly hereafter. However, it is noted that both with the specific embodiment and general concept, that the circulation direction of a circulator may easily be determined empirically by connecting an alternating voltage source across one of the ports to supply power to the circulator and determining the output at the other ports. The adjacent port in the circulation direction will supply a resultant power output exceeding the resultant output at the other adjacent port by an amount of ratio determined by the accuracy of the circulator design. Thus in an ideally designed circulator, the port succeeding in the circulation direction will produce voltage approaching that of the power input and the voltage at the port preceding in the circulation direction will approach zero output.

The desirable condition of zero power output at the port preceding the power input port, will during microphone use, be mainly determined by the match between the phase and admittance (across the desired frequency range) of the circulator to the line circuitry connected to one of the circulator ports, with the line connected across the port next preceding and the earphone connected across the line next succeeding in the circulation direction. Secondarily, the sidetones will be reduced by the match of earphone and microphone circuitry to the circulator. Reflections between the line and the circulator from transmissions in either direction are mainly determined by the phase and admittance match between the line connected to a circulator port and the circulator as seen by the line. Thus, since the line tends to be a capacitive load, the characteristics of the circulator will be designed to provide a capacitive impedance and, in turn, the earphone circuitry will be designed to provide a similar phase characteristic. Although, in an ideally designed circulator the microphone should also match, it will be found that this is not so important to the use of a circulator in this application and that, in the case of the microphone, the impedance match may be very approximate. In the case of the preferred embodiment, this is reflected in the amplifier designs wherein the amplifier will be designed to provide $\phi$ and $\phi+180°$ phase change respectively, where $\phi$ is the phase advance (i.e., capacitive loading) ($0 \leq \phi < 90°$) a function of frequency, and provides a characteristic across the frequency range of approximately the line admittance as viewed by the circulator.

In drawings which illustrate a preferred embodiment of the invention:

FIGS. 1*a* and 1*b* show a three-port circulator applied to a telephone line;

FIG. 2 shows the preferred form of the circuitry of FIG. 1 showing a gyrator embodying two amplifiers acting as a circulator;

FIGS. 3*a* and 3*b* show the preferred form of the two amplifiers;

Figure 1A:
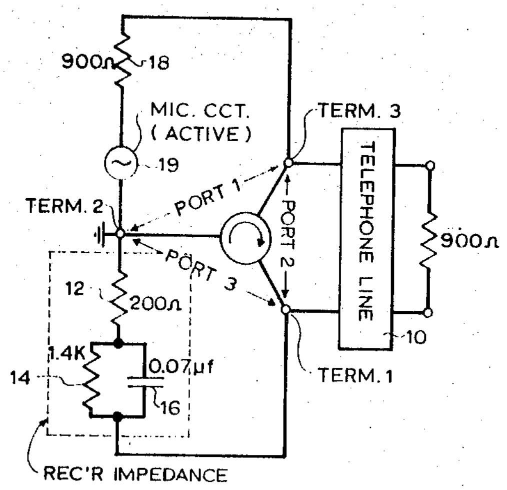
Figure 1B:
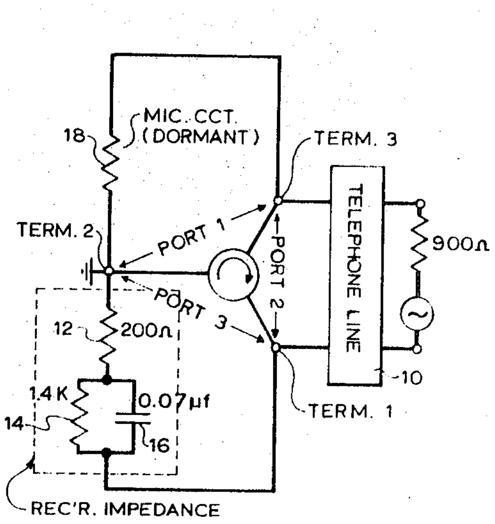

In FIGS. 1*a* and 1*b* are shown a circulator having terminals 1, 2 and 3 defining three ports and having terminals 1, 2 and 3 for delta connection of microphone, earphone and line. The ports are referred to as follows:

| A device referred to as connected to port | is connected across terminals |
|---|---|
| 1 | 2 and 3 |
| 2 | 3 and 1 |
| 3 | 1 and 2 |

Referring to the chart of circulator action on Page 1:

To the extent that the circulator with its loads or sources connected across its port, is not perfectly designed, the power transferred to the desired power input port, i.e., the one in the second column, will be somewhat attenuated and the power transferred to the undersired power output port, i.e., the one in the third column will be present to some degree instead of being totally absent. However, even under these imperfect conditions, with a transistorized circulator, the power output at the desired (cyclically succeeding) port is of a sufficiently greater order than the power output at the undesired (cyclically preceding) port, that the advantages of using a circulator to provide a telephone subset circuit lacking sidetone still accrue.

The circulator with which the invention is concerned is one constructed of solid state components such as transistors, resistors, capacitors etc., operable over the frequency range 200 to 6,000 Hz., comprising a useful range for telephone speech. The range is not intended to be limiting of the invention however and it will be obvious that a wider range (say) 100 to 10,000 Hz. may be covered within the scope of the invention. The invention is not concerned with the prior type of circulator without solid state elements and using wave guides instead of wired connections.

In FIGS. 1*a* and 1*b*, as stated, the telephone line 10 is connected across port 2. The line comprises a mixed capacitive and resistive load which will vary for length of line and other factors, and in these respects will vary in each case, so that for a standardized circulator-subset design, the matching of admittance and phase characteristic to the line will in each case only be an approximation. However, for the purposes of design, a 10,000 ft. line was assumed, terminating in a 900-ohm impedance. With this assumption the capacitive-resistive impedance of the line was matched, sufficiently for practical purposes within the range 200 to 6,000 Hz. by an earphone circuit, which presents to the line a resistance 12 in series with the resistance 14 and capacitor 16 in parallel with each other. The logical sequence is that the circulator is designed to provide an admittance match for the line to avoid reflection and reduce sidetone and then the admittance of the receiver circuit is designed to match the circulator admittance since this latter match is the main factor in optimizing received signals.

The line is connected to port 2 so that in the transmission mode, alternating current signals generated by the microphone are transferred to the line and on to the central office. In the receive mode, signals from the central office reach the subset by way of the line arriving at port 2. The signal subsequently passes into the receiver circuit.

The earphone and earphone circuitry (not shown) are connected in FIGS. 1*a* and 1*b* across terminals 1 and 2 (port 3). These are not shown as their design is well known to those skilled in the art. However, the earphone circuit impedance is designed (also in accord with techniques well known to those skilled in the art), to provide across terminals 1 and 2 the impedance represented by the elements 12, 14 and 16, shown.

The microphone circuitry and impedance matching elements are connected across terminals 2 and 3. For the purposes of this invention the microphone circuitry (not shown but well known to those skilled in the art) may be considered as the alternating current source 19. This is shown in FIG. 1*a* but not in FIG. 1*b*. FIG. 1*a* is considered to represent a depiction of the microphone in the transmit mode (i.e., the user speaking) and FIG. 1*b* a depiction in the receive mode (i.e., with the user listening). The receiver circuit admittance need only be roughly approximated to the admittance of the circulator since the result of mismatch is only a signal at port 1 (to the microphone) when the main signal is being circulated from the line to the earphone. The signal at port 1 applied to the microphone does no harm. Hence the only approximation of the circulator admittance used at port 1 is a 900-ohm resistance connected across the port, in series with the microphone (when used).

With a circulator connected in the manner described, the subset operated (firstly) by providing speech signals input from the line at port 2 to the earphone at port 3, and (secondly) speech signals from the microphone at port 1 to the line at port 2. Sidetone power from port 3 to the receiver will be eliminated during the input at port 1 and the output at port 2 to an extent primarily controlled by the admittance at port 2 matching the circulator admittances. Reflections at the connection between the circulator and the line during transmission from port 1 are prevented to the extent of the admittance match between the circulator and the line. It is noted that the admittance match in the two situations just referred to, should be substantially maintained over the frequency range used, i.e., 200 to 6,000 Hz.

Figure 2:
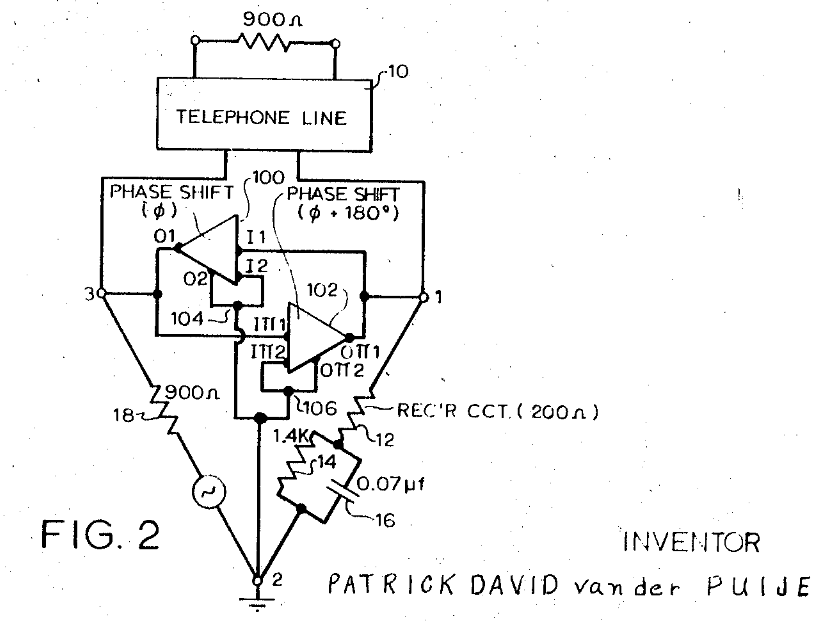

In FIG. 2 is shown a preferred form of the transistorized circulator in accord with the invention.

FIn FIG. 2 a pair of amplifiers 100 and 102, each having two input and two output terminals, labeled as shown.

Amplifier 100 is designed to provide a phase shift between input $V_{11}$–$V_{12}$ and output $V_{01}$–$V_{02}$ of $\phi°$ where $\phi$ is preferably a function of frequency over the range for speech communication 200–6,000 Hz. and the amplifier 100 is designed in accord with well known design techniques, to match for practical purposes the phase characteristics of the line. Amplifier 100 will therefore be designed so that 0 will vary over the frequency range between $\phi°$ and 70° (phase advance) and in accord with a typical phase pattern for the line. Such typical phase pattern is shown in FIG. 4 where desired values have been indicated in solid graph. As it is desirable that the gain of the amplifier 100 correspond with a constant multiplier to the admittance of the line over the operating range of frequencies, amplifier gain is also shown in solid graph in FIG. 5. The dotted graphs illustrate the actual results for gain and phase obtained with the preferred design for amplifier 100 shown in FIGS. 3*a* and 3*b* and later described.

Amplifier 102 is designed to provide a phase shift between input $V_{1\pi1} - V_{1\pi2}$ and output $V_{0\pi1} - V_{0\pi2}$ of 0°+180° where 0 is as already described and the admittance of amplifier 102 is matched over the frequency range as with amplifier 100. One input terminal 1π2 and one output terminal 0π2 of amplifier 102 are connected at 106. One input terminal 12 and one output terminal 02 are connected together at 104. The terminals 104 and 106 are joined and are connected along connection 108 to terminal 2. The output terminal 0π1 of amplifier 102 and the input terminal 11 of amplifier 100 are connected together and to terminal 1. The output terminal 01 of amplifier 100 and the input terminal 1π1 of amplifier 102 are connected together and connected to terminal 3.

It is noted that admittance and phase matching for any amplifier are techniques well known to those skilled in the art. It is noted that to the extent that the gain and phase characteristics of the amplifier do not match the admittance and phase characteristics of the line sidetone at the earphone during transmission by the microphone will exist, and transmission through the circulator to the line attenuated. However, reasonably large differences in admittance match between circulator and earphone circuitry may be tolerated from the actual design and still result in beneficial results, i.e., good transmission and reduced sidetone.

It is noted that the phase angle of amplifier 100 will tend toward 90° (advance) at infinite frequency, being less than 70° over the desired frequency range. Similarly, the phase advance of amplifier 102 will be between 180° and 250° over the desired frequency range tending toward 270° at infinite frequency.

It is noted that if the two amplifiers 100 and 102 (connected as shown) for any reason provided phase changes within the 90°–180° and 270°–360° quadrants, that the effective direction of the circulator would be reversed (i.e., power put in at port 1 would appear at port 3 instead of port 2 and so on) and for use, in accord with the invention the positions of microphone and earphone would have to be interchanged relative to the line.

In the embodiments of FIGS. 1*a* and 1*b* and of FIG. 2 the terminal 2 is preferably grounded. This does not effect the operation of the circulator circuitry per se but does provide a balanced situation relative to the line and minimizes earphone hum and other effects on the subset circuitry of longitudinal or inductive currents developed in the outside lines. The gain of amplifier 102 should as already implied, approach, as closely as possible, that of amplifier 100.

The embodiment of FIG. 2 shows, between terminals 1, 2 and 3, a gyrator embodied by amplifiers 100 and 102 connected as shown, and with the microphone, earphone and line connected in delta there around in the proper circulator sequence. The transistorized amplifiers, preferably comprise resistors, capacitors and transistors to allow the use of integrated circuit elements, are designed in the form desired with the phase shaping network required. It is noted that such amplifiers should have high input and output impedance.

To the extent that the circulator admittance deviates from the ideal admittance and phase matching conditions sidetone to the earphone during transmission by the microphone will exist, however the degree of this is minimized since it may be mathematically proven that with the circulator design of FIG. 2 sidetone, in the earphone circuitry during transmission by the microphone is mainly dependent upon the equivalence of the line admittance to the circulator admittance at port 2 but only depends as a second order effect on other admittance mismatches. Thus sidetone may be effectively diminished by the circulator circuitry shown since with suitable design the earphone admittance for practical purposes, matches the circulator impedance presented to port 3.

Figure 3A:
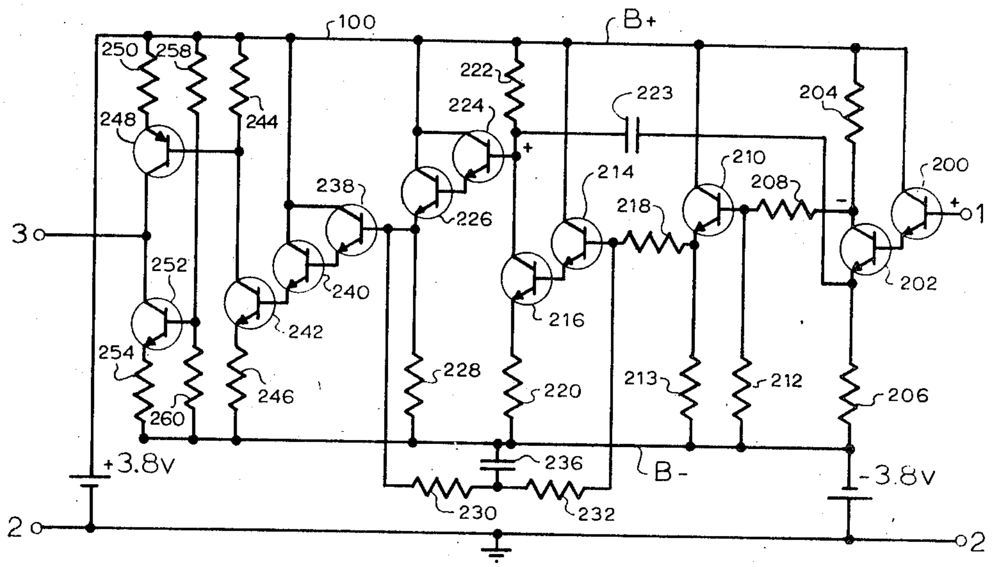
Figure 3B:
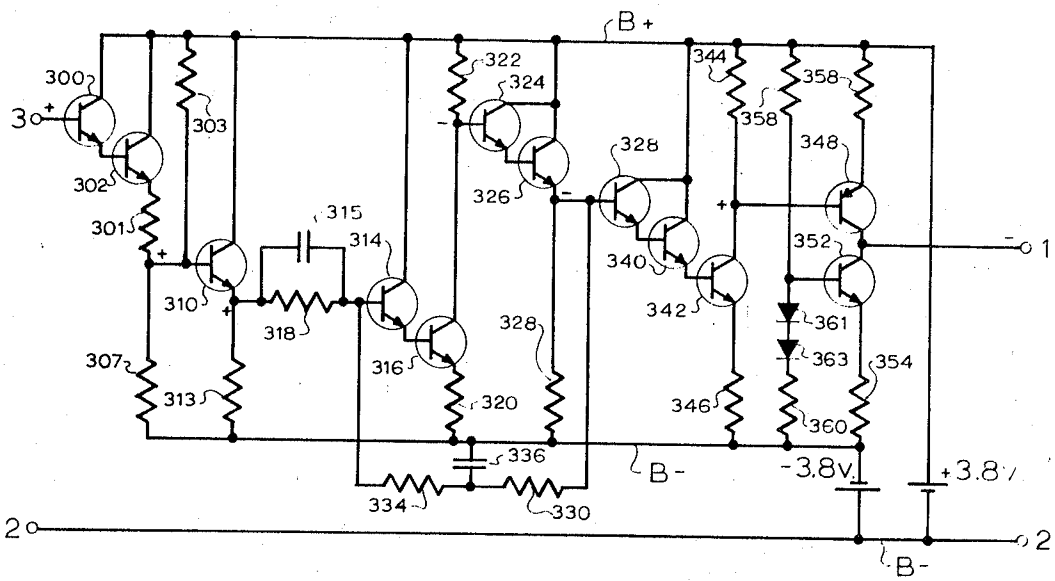
Figure 4:
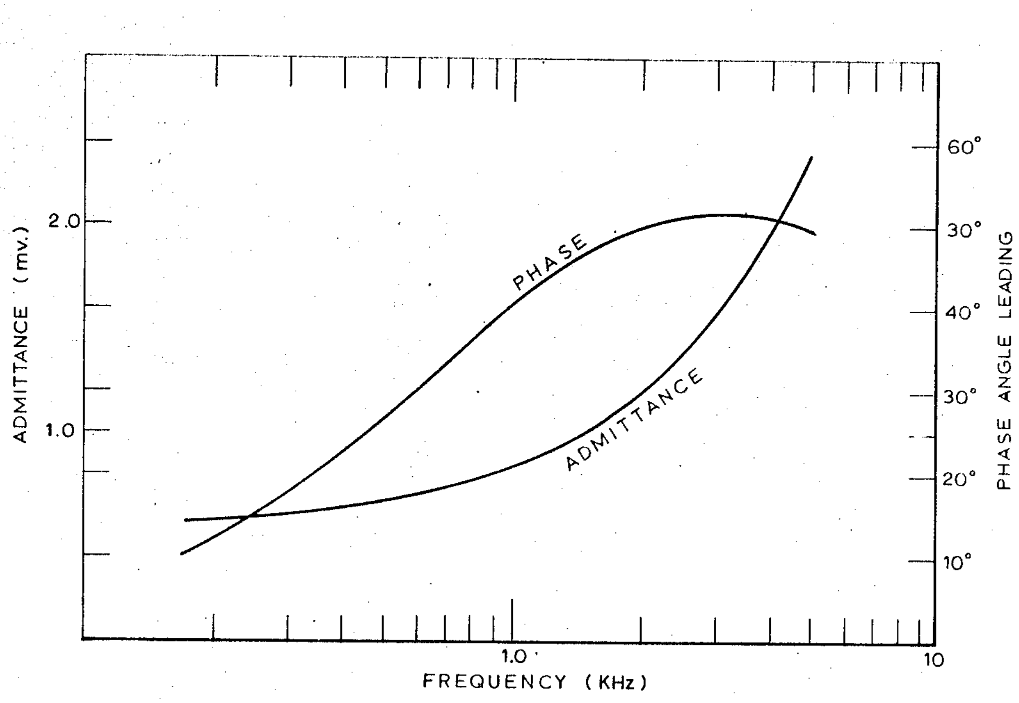
FIG. 4 shows the admittance and phase characteristics of a typical telephone line.

In FIGS. 3*a* and 3*b* the design of amplifiers as a preferred form, for use in the circuitry of FIG. 2. The circuitry of FIG. 3*a* representing a preferred design of amplifier 100 comprises a pair of transistors 200 and 202 connected as a Darlington pair to provide a high-impedance input applied across terminals 1–2 with terminal 1 connected to the base of transistor 200. Resistance 204 connects the collector of transistor 202 to the B+ line and resistance 206 connects the emitter of 202 to the B– line. The B+ and B– lines are biased by positive and negative 3.8 volt sources as shown. The output of the transistor 202 is take at the collector and applied through resistance 208 to the base of a transistor 210. The base of transistor 210 is also connected to B– through resistance 212.

The transistor 210 connected as shown, including the emitter connection through resistance 213 to B–, forms the driver stage for a Darlington pair of transistors 214 and 216 connected as shown with the emitter of transistor 210 connected to the base of transistor 214 through a resistance 218. The emitter of transistor 216 is connected to B– through a resistor 220 and the collector is connected to B+ through a resistor 222. The collector of transistor 216 is also connected to the emitter of transistor 202 through a condenser 223. The negative feedback provided through condenser 223 is one of the means by which the phase shift $\phi$ is adjusted through the amplifier. Transistors 224 and 226 comprise another Darlington pair connected as shown. Resistor 222 connects B+ to the base of transistor 224 and provides the output supplied from the collector of transistor 216 to the base of transistor 224. The emitter of transistor 226 is connected to B– through resistance 228. Thus the output of the transistor 226 appears at its emitter. The phase characteristics of the amplifier 100 are mainly controlled by the T-network comprising resistances 230 and 232 in series between the emitter of transistor 226 and the base of 214, with the junction between the two resistances connected to B– through condenser 236. This particular network acts as a low-pass filter giving the main amplification path the characteristics of a high pass network with the values chosen to provide the gain and phase characteristics desired. (These being also affected by the condenser 223). The preferred phase and gain characteristics to match the line phase and admittance are represented in design (solid line) and practice (dotted line) in FIG. 5. It is important to note however, that the phase characteristics desired may be different in a different situation, and hence a different phase shifting network (designed in accord with well known techniques) may be applied to replace elements 230, 232 and 236.

The emitter of transistor 226 is connected to the base transistor 238 of the further Darlington pair 238 and 240 connected as shown. The emitter of transistor 226 is also connected to ground through resistor 228. Transistor 240's emitter is connected to the base of transistor 242 which comprises the driver stage for the output. The emitter of transistor 242 is connected to B– through resistor 246 and the collector of transistor 242 is connected to B+ through resistor 244 and to the base of output stage transistor 248. The emitter of transistor 248 is connected to B+ through resistance 250. The collector of transistor 248 is connected to the collector of transistor 252 whose emitter is connected to B– through resistance 254. The base of transistor 252 is connected between resistances 258 and 260 which form a potentiometer between B+ and B–. The output of the amplifier 100 is supplied to terminal 3 from the collector of transistor 248. In the amplifier shown, the phase is the same at the output terminals 2–3 as the input terminals 1–2 plus the advance contributed by the phase shifting network as illustrated in FIG. 3*a*. Due to the Darlington pair of transistors 200 and 202 at the input, the amplifier circuit has a high input impedance across terminals 1–2. Due to the use of transistor 252 as part of the load of transistor 248, a high output impedance across terminals 3–2 is provided.

The circuitry of FIG. 3*a* represents a preferred design of amplifier 100 for use in the circuitry of FIG. 2. The design for amplifier 102 shown in FIG. 3*b* is similar to that of FIG. 3*a* except for changes related to the additional 180° phase shift and for clarity in correlating the elements of FIG. 3*b* with those in FIG. 3*a*, similar elements have been given similar numbering 100 higher.

A pair of transistors 300 and 302 form the high input impedance Darlington pair connected as shown.

However, the output of transistor 302 is taken from the emitter instead of the collector as distinct from the circuit amplifier 100 FIG. 3*a*. The rest of the circuitry of the two amplifiers being substantially the same, it is this difference in connection which provides the 180° phase difference in the characteristics of the two amplifiers. The difference in connection between transistors 202 and 302 means that there is no resistor connected to transistor 302 collector, analogous to resistor 204. In FIG. 3*b* the emitter of transistor 302 is connected to B– through resistances 305 and 307 in series. The output of transistor 302 is taken at the junction of these resistances and this is connected to the base of transistor 310. The base of transistor 310 is connected by resistance 303 to B+, rather than by a resistance to B–. In FIG. 3 no phase adjustment condenser analogous to 223 is provided, but phase adjustment is provided by a condenser 315 in parallel with resistance 318 connected between the emitter of transistor 310 and the base of transistor 314. This phase adjustment operates to shape the phase characteristics together with the T-feedback network comprised of resistances 330 and 334 and condenser 336 whose function and design is similar to that provided by the T-network of FIG. 3

Figure 5:
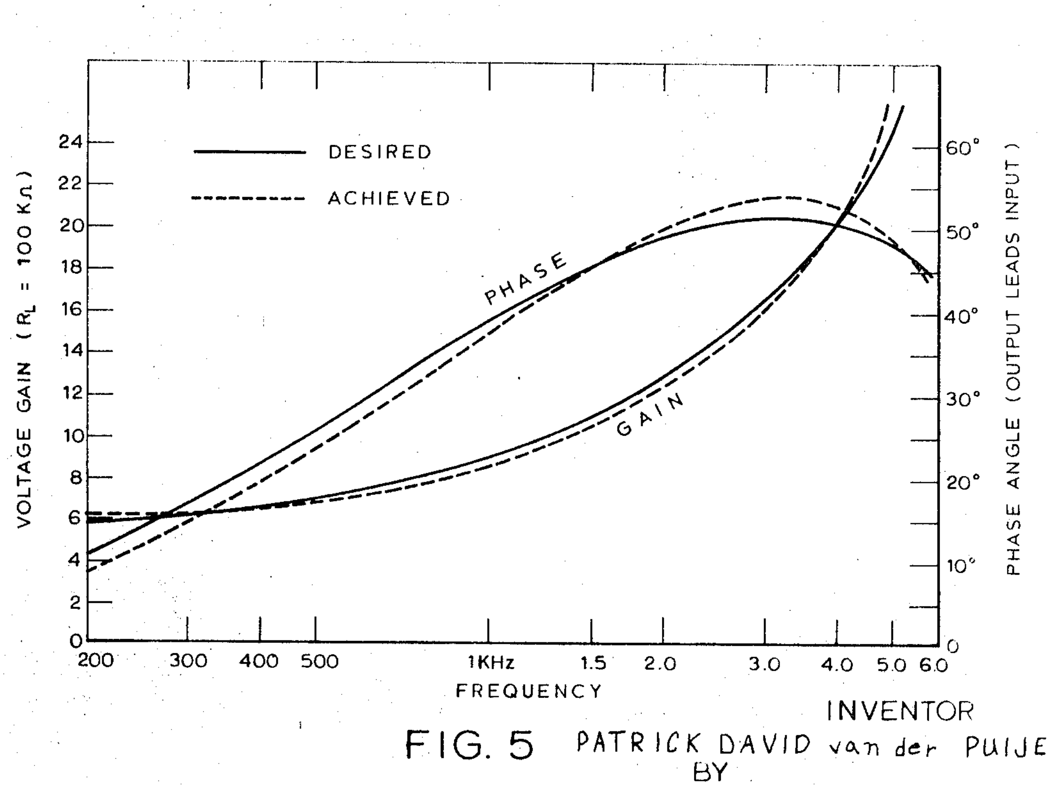
FIG. 5 shows observed test results for gain and admittance using the amplifier of FIG. 3*a*; and 3*b* with 180° phase difference.

In FIG. 3*b* the base of transistor 352 is connected to ground through diodes 361 and 363 in series with each other and resistance 360 to B–, with the diodes 361 and 363 polarized to conduct toward B–. The diodes are designed to provide temperature adjustment to compensate for the "drift" of the emitter of transistor 352. The circuit of FIG. 3*b* otherwise, is connected, and its operation and advantages, phase and gain characteristics are the same as the circuit of FIG. 3*a*. Thus the gain will be as shown in FIG. 5 and the phase will be as shown in FIG. 5 but with the ordinate values considered as increased by 180°. The phase change in amplifier 100 (FIG. 3*a*) is therefore $\phi$– advanced and the phase of amplifier 102 (FIG. 3*b*) is $\phi$+180° advanced. These amplifiers are connected as indicated in FIG. 2 to form the gyrator which acts as a circulator in accord with the purposes of the invention. As previously discussed, the circulator is designed to have the admittance characteristics to match the line to reduce reflection and to match the line circuitry to eliminate sidetone. In practice sidetone is not completely eliminated, although much reduced due to the use of the circulator in accord with the invention.

The presence of a small amount of sidetone is in some ways an advantage as hereinafter described.

FIG. 4 shows the admittance and phase characteristics for a typical subscribers loop 10,000 ft. long of 26y-guage cable, terminated in a 900-ohm resistance. This can only be a good approximation in view of the variation in lines and distributed impedances on any line. It can be shown that for proper circulator action the required admittance and phase for a circulator used with such a line, should be in accord with the characteristics of FIg. 4. It can further be shown that such circulator characteristics can be achieved with a gyrator using the amplifiers connected as shown, where the gain and phase of amplifier 100 are as shown in FIG. 5 (the phase being the same as that of the line and the amplifier gain being equal to the line admittance multiplied by a constant and both being a function of frequency). The gain and phase of characteristics of amplifier 102 are similar to those of amplifier 100 with the difference that the phase angle will be increased by 180° over that shown. FIG. 5 shows in dotted line the gain and phase characteristics of amplifier 100 with proper choice of the resistance and capacitance values, indicating that with such choice, a close agreement with the required values may be achieved.

Figure 6:
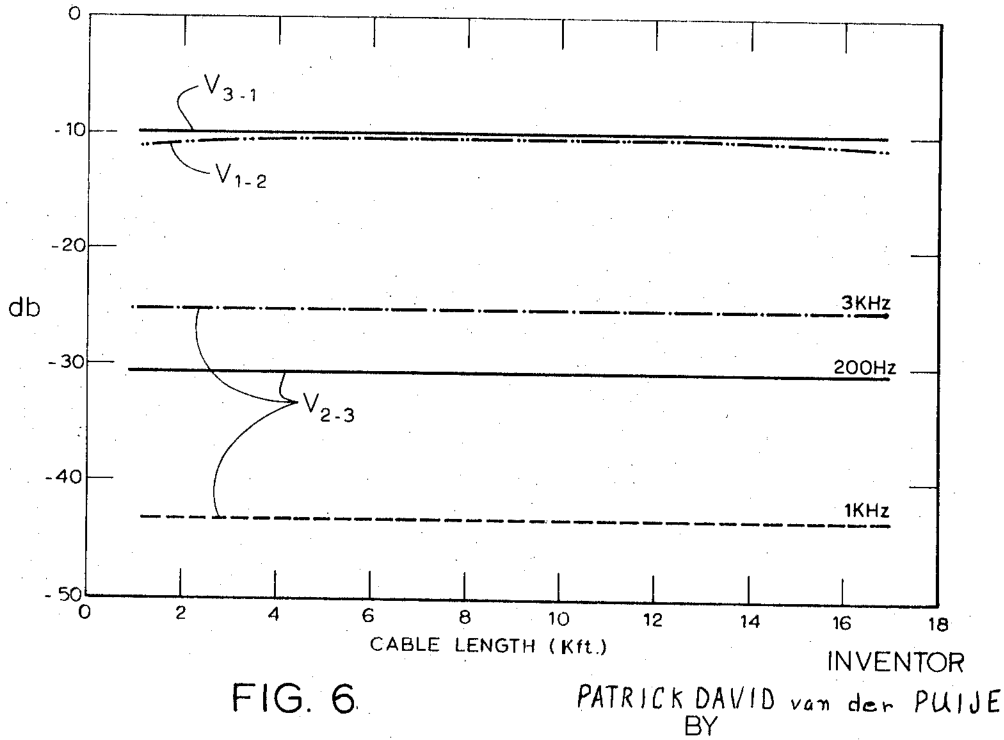
FIG. 6 shows effects of line length in the receive mode.

FIG. 6 shows the results of tests performed for microphone transmission with a circulator using the amplifiers shown in FIGS. 3*a* and 3*b* for a line of various cable length. $V_{3-2}$ is the voltage from the microphone circuit and is an input voltage as far as the circulator is concerned $V_{3-1}$ is the resultant voltage applied by the circulator to the line. It is seen that these voltages are very close over the ranges of cable length tested. $V_{1-2}$ is the unwanted (sidetone) voltage provided to the earphone circuit by the circulator and although not zero shows a marked reduction of sidetone having its best effect near the design cable length of 10,000 feet.

However attenuation across the entire useful range is an advantageous reduction is sidetone.

Figure 7:
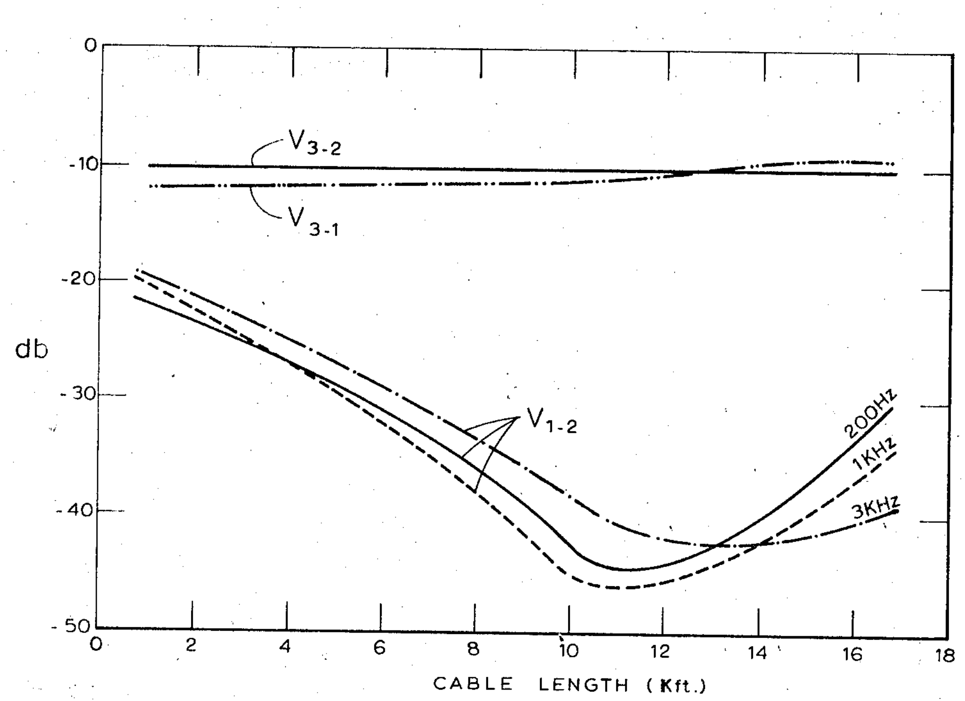
FIG. 7 shows the effects of line length on sidetone in the transmission mode.

FIG. 7 shows the circuitry using the amplifiers of FIGS. 3*a* and 3*b* in the receive mode i.e., with the receiver actuated by the line $V_{3-1}$ is the line voltage applied to the circulator, $V_{1-2}$ the resultant voltage applied to the earphone by the circulator. $V_{2-3}$ is the undersired resultant voltage applied by the circulator to the microphone. This undesirable voltage is well attenuated by the circuitry involved and the remaining voltage has of course no unwanted sensory effects since it appears at the microphone, hence the very rough admittance approximation made, namely the 900-ohm resistance is close enough for the practical results required.

Returning to FIG. 6 is may be shown that in consideration the effects on sidetone at the earphone i.e., during microphone use) the admittance match between the line circuit and the circulator is a first order effect but in FIG. 6 the admittance match between the other circuits and the circulator has only a very much lower order effect on sidetone.

The circulator of FIG. 1(*a*) and 1(*b*) is completely symmetrical, and the microphone, line and earphone may obviously be connected to other ports than those shown as long as the microphone, line and earphone follow in that order in the circulation direction. Similarly the line in the preferred embodiment of FIg. 2 may be connected to port 1 or port 3 instead of port 2 as long as the earphone is in each case connected to the next succeeding port in the circulation direction and the microphone is connected to the next preceding port in the circulation direction. In each case the diminution of sidetone will be found to exist in accord with the purpose of the invention and to a degree commensurate with the approach of the circulator characteristics to design ideals. The circulator direction is clockwise in FIG. 2 for $\phi<90°$. In any case of doubt however the circulation direction of a circulator or of a gyrator acting as such may be easily determined. When in the embodiment of FIG. 2, the terminal opposite the port to which the line is connected is not grounded hum will occur at the earphone but this is not directly related to the circulator operation as previously explained.

The possibility to connect line, earphone and microphone in that order, in the circulation direction applies of course to the amplifiers of FIGS. 3*a* and 3*b* since these are preferred forms for use as the amplifiers of the gyrator of FIG. 2.

FIG. 8 shows the adaptation of the inventive circuitry to a star connection, instead of delta as used in the other drawings. Although considered within the scope of the invention, it is considered a less advantageous arrangement than the delta connection used in the other drawings and it is believed will seldom be used. The main disadvantage of the star connection is that with this connection, longitudinal signals created in the subscriber's line by exterior voltages will in most locations and connections create sufficient hum on the connection as to be unuseable.

I claim:

1. For limiting sidetone in a telephone set, a three-port circulator, wherein each port is defined by a pair selected from the three terminals of a circuit using two amplifiers, each amplifier having a pair of input and a pair of output terminals which amplifiers provide phase changes between input and output differing from each other by approximately 180°, wherein said three terminals are defined as follows:

a. a connection to one input and one output terminal of each amplifier;

b. the connection of the other input terminal from one amplifier and the other output terminal from the other amplifier; and c. the connection of the other output terminal from sad one amplifier and the other input terminal from said other amplifier;

wherein a telephone line, telephone receiver and mouthpiece are connected in that cyclical order to the ports whose corresponding cyclical order is arranged to circulate power in said cyclical order.

2. Circuitry as claimed in claim 1 wherein the phase change contributed by said one amplifier is between 0°–70° phase advance over the frequency range 200 to 6,000 Hz. and the phase contributed by said other amplifier is between 180° and 250° phase advance and the direction of circulation of power in said amplifier is cyclically *a–c*, *c–b*, *b–a*.

3. Three-port transistorized circulator using wires for connecting circuit elements for limiting sidetone in a telephone set designed for the sense of power circulation wherein power input at a port provides much greater output at the next following port, in the cyclical sense of rotation, then the power output at the next preceding port;

wherein a telephone line is connected across one of said ports;

a telephone receiver is connected across the next port in the cyclical sense of power circulation;

and a telephone mouthpiece is connected across the third port in the sense of power circulation, wherein said circulator comprises a pair of amplifiers, each amplifier having two input terminals and two output terminals with one input terminal being connected to one output terminal and with this connection being connected to the corresponding connection for the other amplifier, and, in the case of each amplifier, the other input terminal thereof being connected to the other outlet terminal of the other amplifier, said amplifiers being designed so that the phase change in one amplifier, between input and output, differs from the corresponding phase change in the other amplifier by approximately 180°, where the three said ports are defined by:

a. the connection between the connected input and output terminals of the two amplifiers;

b. one connection between the other input terminal of one amplifier and the other output terminal of the other amplifier, c. the other connection between the other input terminal of the other amplifier and the other output terminal of the one amplifier.